(12) United States Patent
Takai et al.

(10) Patent No.: US 6,315,150 B1
(45) Date of Patent: Nov. 13, 2001

(54) BOWL-SHAPE CONTAINER

(75) Inventors: Toshihiro Takai; Kenichi Mizoguchi; Akio Yoshikoshi; Takashi Kikkawa, all of Aichi-ken (JP)

(73) Assignee: Kabushiki Kaisha Asano Kenkyusho, Aichi-Ken (JP)

( * ) Notice: Subject to any disclaimer, the term of this patent is extended or adjusted under 35 U.S.C. 154(b) by 0 days.

(21) Appl. No.: 09/453,580

(22) Filed: Dec. 3, 1999

(30) Foreign Application Priority Data

Dec. 4, 1998 (JP) .................................................. 10-345471

(51) Int. Cl.[7] .................................................. B65D 17/00
(52) U.S. Cl. .......................... 220/628; 220/608; 220/659; 220/675; 229/400
(58) Field of Search ..................................... 220/669, 675, 220/658, 659, 605, 608, 628, 633; 229/400, 403

(56) References Cited

U.S. PATENT DOCUMENTS

| | | | |
|---|---|---|---|
| 3,169,689 | * | 2/1965 | Schwartz ................................ 229/400 |
| 3,291,361 | * | 12/1966 | Commeyras ....................... 220/659 X |
| 3,606,262 | * | 9/1971 | Hoff ................................. 229/400 X |
| 4,010,867 | * | 3/1977 | Jones ....................................... 220/608 |
| 4,577,775 | * | 3/1986 | Kresin ............................... 220/608 X |
| 5,062,568 | * | 11/1991 | Hill et al. ......................... 229/400 X |
| 6,003,720 | * | 12/1999 | Morimoto et al. .................... 220/675 |

FOREIGN PATENT DOCUMENTS

| | | |
|---|---|---|
| 4-327129 | 11/1992 | (JP) . |
| 10-155625 | 6/1998 | (JP) . |

* cited by examiner

*Primary Examiner*—Steven Pollard
(74) *Attorney, Agent, or Firm*—Armstrong, Westerman, Hattori, McLeland & Naughton, LLP

(57) ABSTRACT

A bowl-shaped container has a rim of a bottom and the rim is hollow. The container is made of a thermoplastic resin sheet, and wherein the hollow rim is formed by folding the thermoplastic resin sheet including a side wall surface and a bottom wall surface continuous with each other into the shape of a bag and by welding the sheet at the wall surface sides. The body of the container may have a plurality of ribs protruding outward and no slit-like recess in its inner circumferential face. The ribs are formed by thrusting the thermoplastic resin sheet into a plurality of grooves formed in a forming female die.

4 Claims, 21 Drawing Sheets

BOWL-SHAPE CONTAINER

BACKGROUND OF THE INVENTION

1. Field of the Invention

This invention relates to a bowl-shaped container made of a thermoplastic resin.

2. Description of the Prior Art

When a bowl-shaped container having a rim of a bottom is made of a thermoplastic resin sheet, the melted resin sheet is conventionally folded at the rim of the bottom. FIG. 21 shows a section of the rim made in this conventional method. Also, when a body of the container is rendered rugged, the thermoplastic resin sheet is folded into folds. FIG. 22 shows a section of the rugged body.

In the aforesaid conventional method, an annular opening is formed in the bottom of the folded container so as to correspond to the rim. Accordingly, when poured into the container, soup or the like enters the annular opening. This results in no problem when the container is non-returnable. However, when the container is cleaned for re-use, it is difficult to wash away the soup or the like remaining in the annular opening. It is also difficult to wash away the soup or the like remaining in openings of the folds formed in the body of the container.

SUMMARY OF THE INVENTION

Therefore, an object of the present invention is to provide a bowl-shaped container which is formed by folding a part of the resin sheet and yet which can prevent soup or the like from entering the opening formed in the bottom or the body thereof.

To accomplish the object, the present invention provides a bowl-shaped container having a rim of a bottom, said rim being hollow. The rim of the bottom serves as a mount preventing the container from rolling and prevents fingers from coming into direct contact with the outer surface of the container. Concerning the latter, when hot soup is poured into the container, heat is transmitted to the wall surface such that the container is prevented from being unholdable. Accordingly, the rim of the bottom preferably has a low heat conductivity. When the rim is rendered hollow as described above, the heat conductivity of the rim can be reduced. Consequently, an amount of heat transferred to the fingers can be reduced even when hot soup is poured into the bowl.

In a preferred form, the container is made of a thermoplastic resin sheet, and the hollow rim is formed by folding the thermoplastic resin sheet including a side wall surface and a bottom wall surface continuous with each other into the shape of a bag and by welding the sheet at the wall surface sides. When a rim forming recess is used which broadens the container toward one end thereof and then reduces the inner diameter, the rim is rendered substantially triangular such that a cavity is formed. In this construction, the thermoplastic resin sheet having a substantially uniform thickness is folded into the bag shape such that the rim is formed. Consequently, the cavity can be prevented from being one-sided. Further, when the cavity is actually present, an appearance volume is increased as compared with an actual amount of thermoplastic resin sheet.

The hollow rim has an outer circumferential surface formed into such an inclined face that the outer circumferential surface expands outward as it goes downward. When the sheet is folded into the bag shape so that the cavity is formed, the container is voluminous when it is expanded outward. Further, it is easy to vertically form an inner wall surface which is formed using a bottom plate.

When ribs are formed on an outer face of the bowl body, a good heat-insulating structure is obtained. Accordingly, it is effective to fold the thermoplastic resin sheet so that the ribs are formed. However, when a gap is formed between folded portions, soup containing fat component enters the gap. In this case, it is difficult to wash soup away.

In view of the above-described problem, the invention also provides a bowl-shaped container made of a thermoplastic resin sheet, the container including a body having a plurality of ribs expanding outward and no slit-like recess in an inner circumferential face thereof. Since the ribs reduce the heat conductivity, the circumferential face of each rib is not heated even when hot soup is poured, and the soup can be prevented from entering the gap.

The ribs are preferably formed by thrusting the thermoplastic resin sheet into a plurality of grooves formed in a forming female die. Since the sheet is thrust into the groove of the forming female die, the gap can easily be closed.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENTS

Figure 1:
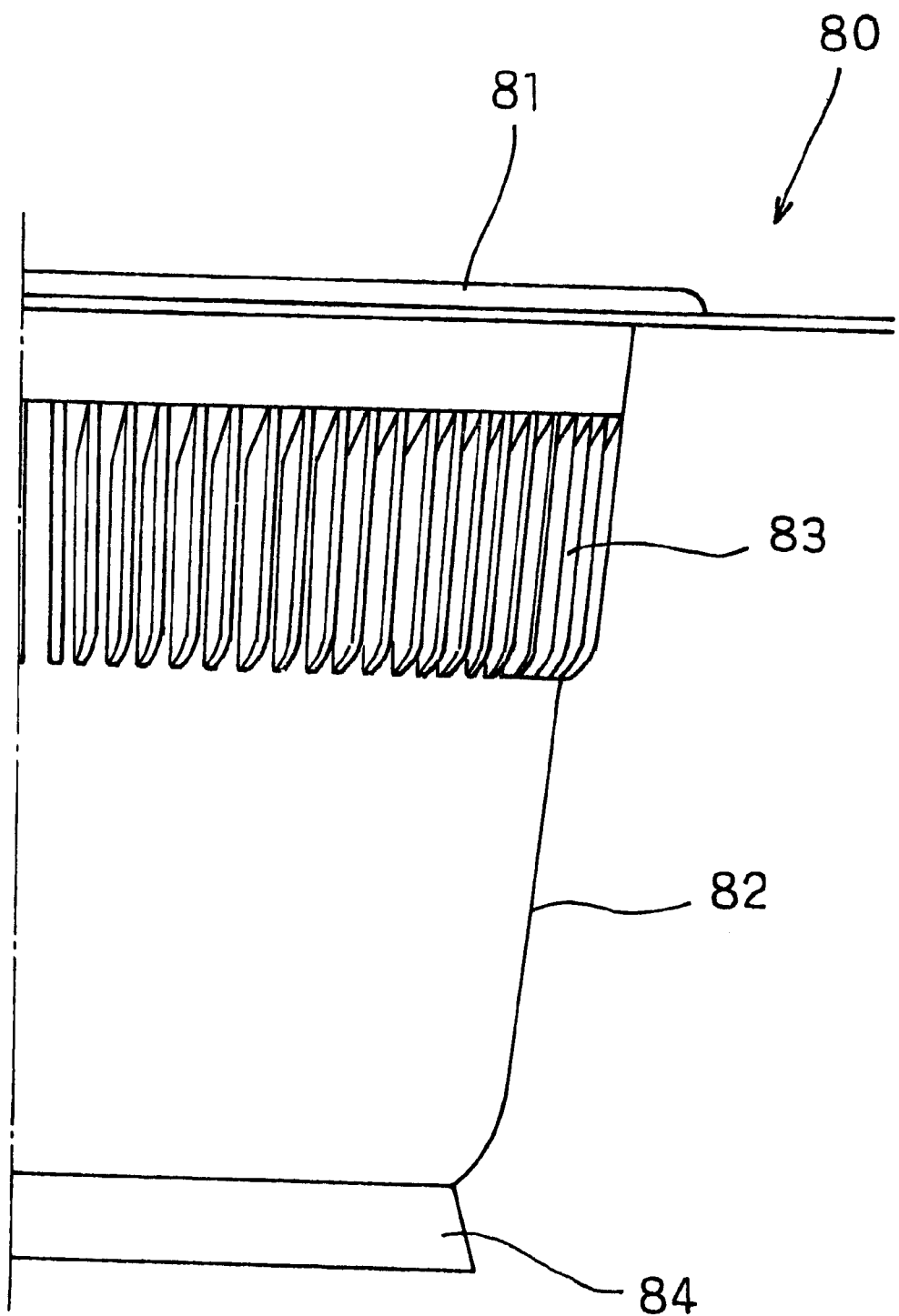
FIG. 1 is a side view of a bowl-shaped container of one embodiment in accordance with the present invention.

One embodiment of the present invention will now be described with reference to FIGS. 1 to 14. Referring to FIG. 1, the bowl-shaped container of one embodiment in accordance with the invention is shown. The bowl-shaped container 80 has a rim 84 of the bottom, and the rim is hollow. The container 80 includes a body 82 having a plurality of ribs 83 each of which protrudes outward from an outer surface thereof and has no slit-like recess in an inner circumferential face thereof.

Figure 2:
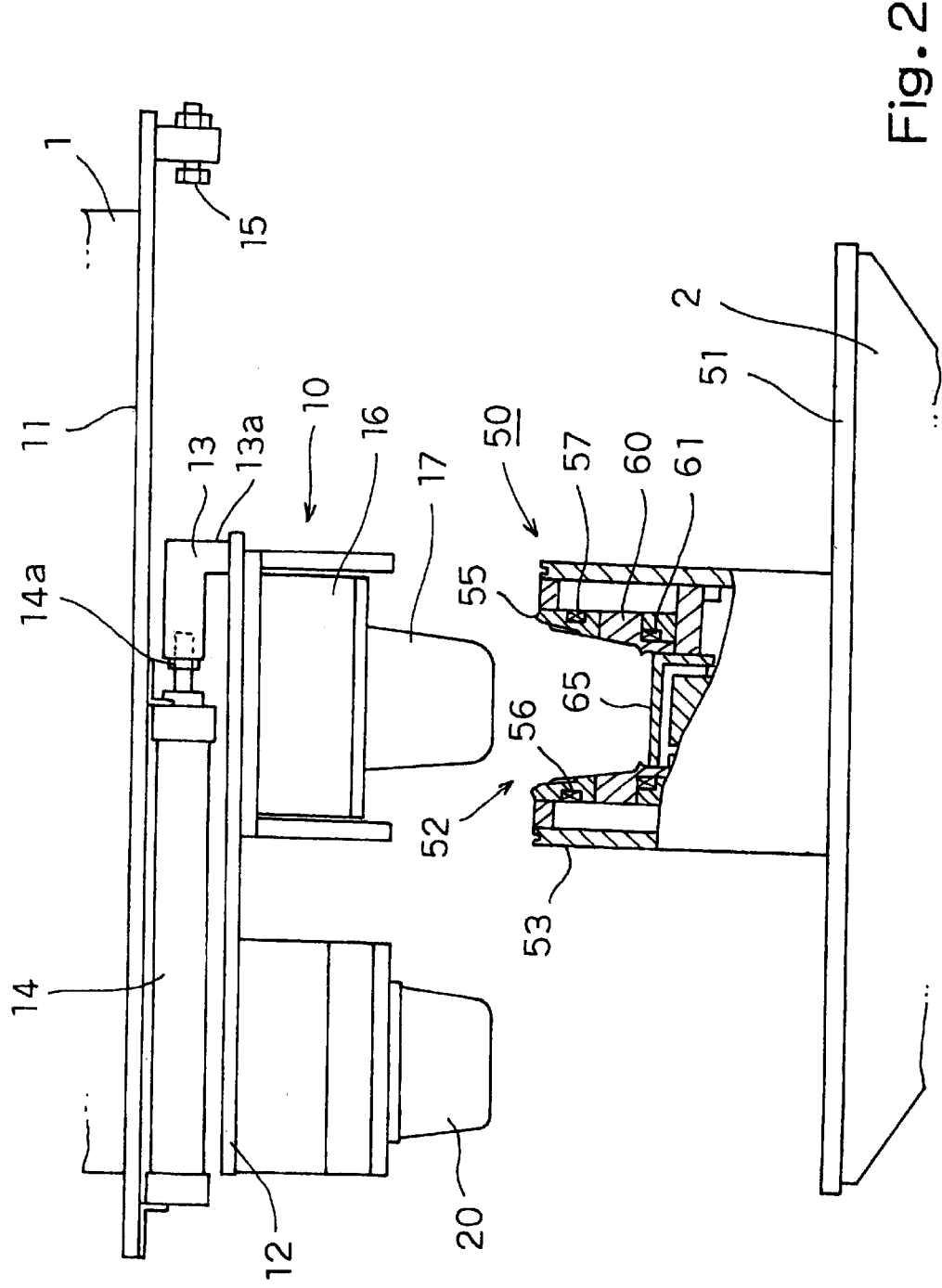
FIG. 2 is a partially broken side view of a thermoforming apparatus for forming the bowl-shaped container.

Referring to FIG. 2, a thermoforming apparatus for forming the bowl-shaped container 80 is shown. The thermoforming apparatus includes an upper table 1 and a lower table 2 fixed to driving mechanisms (not shown) respectively. The upper and lower tables 1 and 2 are moved vertically by a predetermined stroke by the respective driving mechanisms. An upper table assembly 10 is mounted on the upper table 1, whereas a lower table assembly 50 is mounted on the lower table 2. A mounting plate 11 is fixed to the upper plate 1. The upper table 1 is further provided with a base 12 guided by a guide bar (not shown) so that base is moved horizontally. A block 13 projects from an upper face of the base 12. A pneumatic cylinder 14 serving as a driving element fixed to the mounting plate 11 has a rod 14a with a distal end connected to the block 13.

More specifically, the base 12 is mounted on the pneumatic cylinder 14 further mounted on the mounting plate 11 so as to be moved horizontally by a predetermined stroke. For adjustment of the moving range, a stopper 15 is provided on the mounting plate 11. The block 13 has an outer end face 13a which is caused to abut against the stopper 15 so as to be positioned. The base 12 has a backside on which a pneumatic forming chamber 16 having an open lower end is mounted. The chamber 16 includes a centrally disposed pneumatic forming plug 17. A cooling male die 20 is mounted on the base 12 so as to be spaced away from the plug 17. When the rod 14a is extended and contracted by the pneumatic cylinder 14, the cooling male die 20 and the pneumatic forming plug 17 can be switched therebetween. Thus, the upper table assembly 10 switches the plug 17 and the cooling male die 20 alternately.

Figure 3:
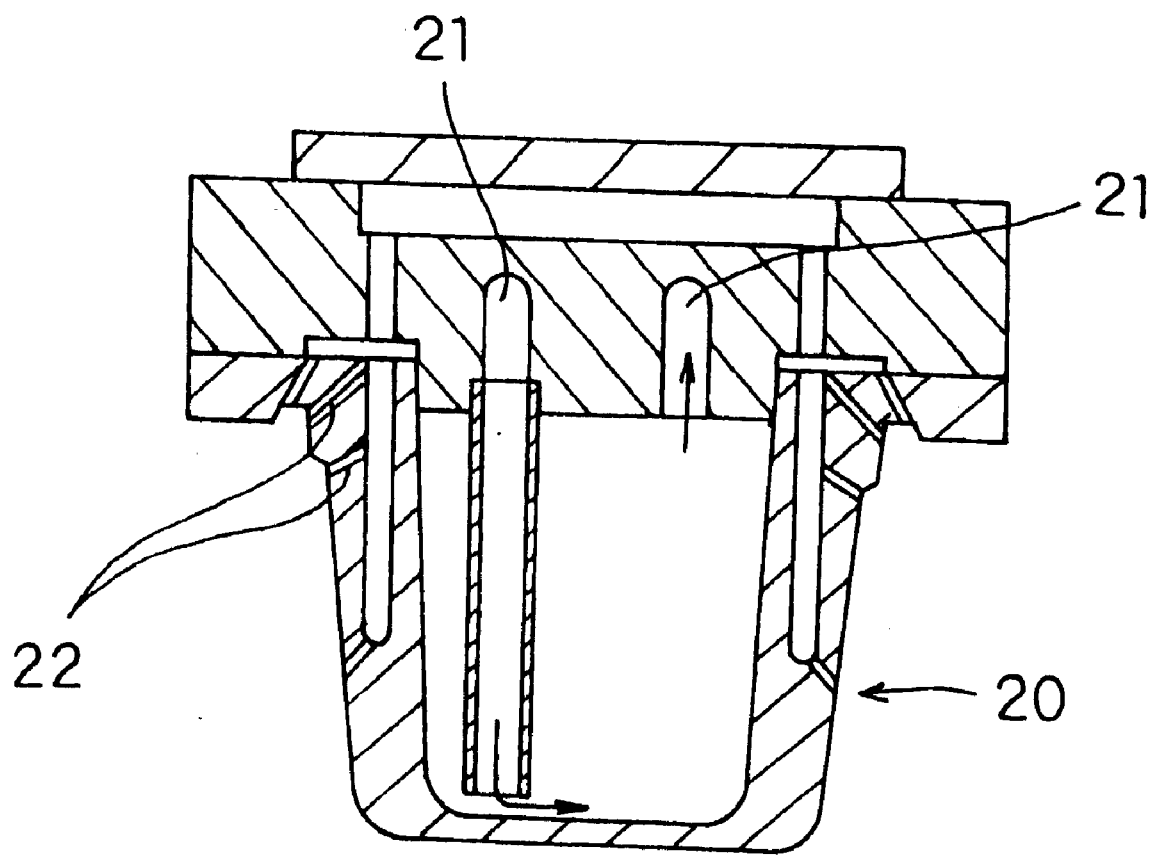
FIG. 3 is an enlarged sectional view of a cooling male die used in the thermoforming apparatus.
Figure 4:
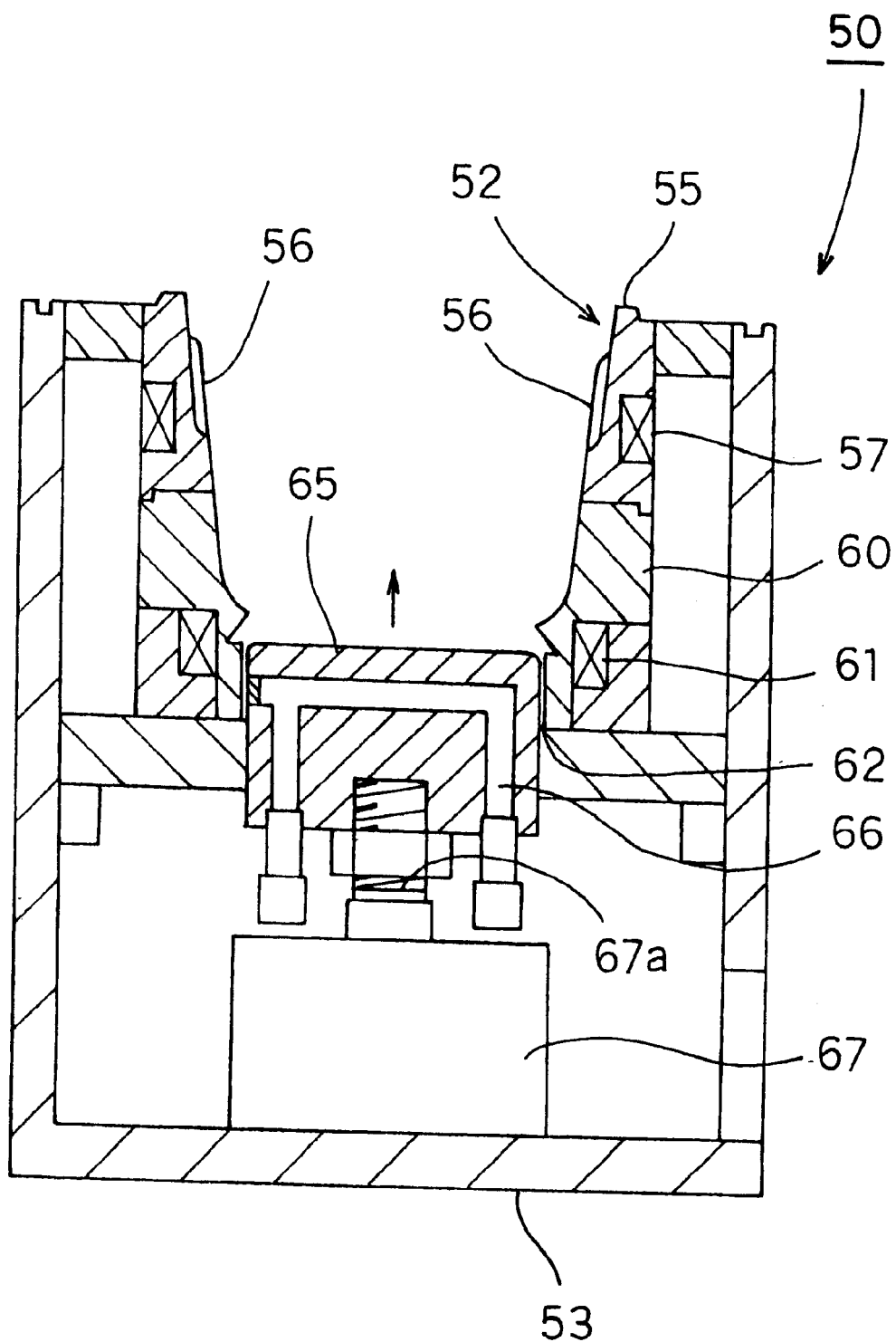
FIG. 4 is an enlarged sectional view of a female die used in the thermoforming apparatus.
Figure 5:
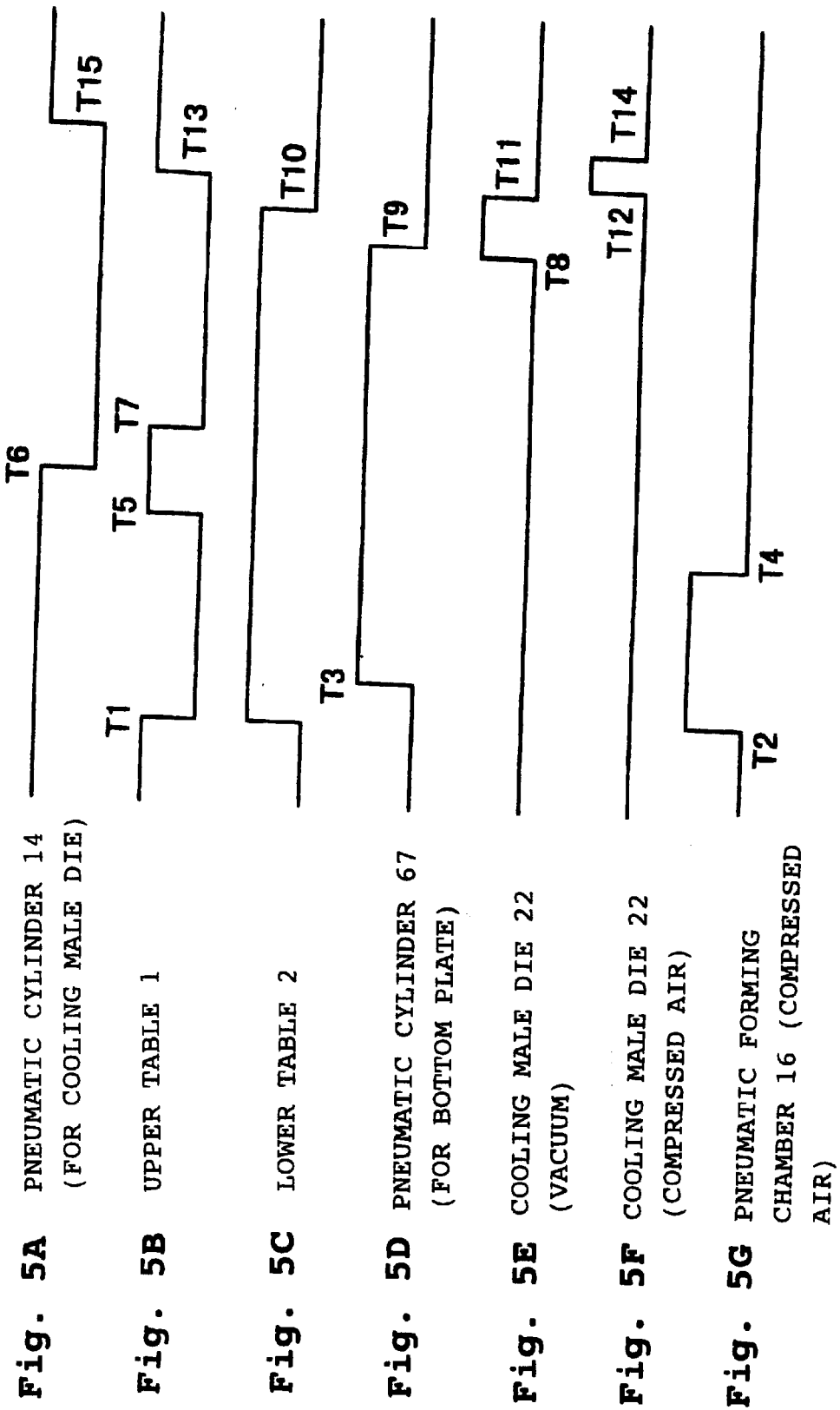
FIGS. 5A to 5G are timing charts showing the operation sequence of the thermoforming apparatus.

The cooling male die 20 is provided for shaping the inner surface of the container 80. The die 20 has a cooling passage 21 through which a cooling liquid is circulated so that the temperature of the die is maintained in a predetermined range as shown in FIG. 3. The die 20 further has suction holes 22 formed to correspond to an opening of the container 80 and the body 82. On the other hand, the lower table assembly 50 includes a base 51 provided with a female die 52 as shown in FIG. 4. The female die 52 is disposed in a frame 53 forming a gas tight space together with the chamber 16. The female die 52 has an inner surface conforming to the bowl shape of the container 80.

The female die assembly 52 includes an upper die 55, a middle die 60 and a bottom plate 65. The upper die 55 is used to form a part of the container 80 from the opening 81 to an upper portion of the body 82. The upper die 55 has vertical grooves 56 formed in a portion of its inner circumferential face corresponding to the upper body portion. The grooves 56 are provided for forming ribs 83 each of which has a thickness of about 0.7 mm and a length of about 2.5 mm, for example so that the ribs 83 have the same depth and shape. The middle die 60 is provided for forming a lower portion of the body 82 and a part of an outwardly spread rim 84. The middle die 60 has an opening in the bottom. The bottom plate 65 is inserted in the opening of the middle die 60 so as to be vertically moved. The bottom plate 65 is driven by the pneumatic cylinder 67 as will be described later.

The middle die 60 is spread outward and then narrowed so that an opening is formed in the bottom of the container and a outwardly spread rim 84 is continuous from the bottom opening. The narrowed portion of the middle die 60 forms a hole 62 having a slightly larger diameter than the bottom opening of the container. The bottom plate 65 is disposed in the hole 62 with a predetermined clearance therebetween. The bottom plate 65 has a generally flat top and a rounded circumferential edge. The bottom plate 65 has a slightly larger diameter than the bottom opening of the container. The top of the bottom plate 65 agrees substantially with the narrowed portion of the middle die 60 when the bottom plate assumes a lower end position. The rounded face of the bottom plate 65 is spaced away slightly from the inclined face for forming the rim 84 when the bottom plate assumes an upper end position. Such a clearance that two thermoplastic resin sheets are welded together is provided at the slightly spaced position. A portion of the middle die 60 lower than the bottom opening and forming the rim is referred to as "rim forming recess."

A heater 57 is embedded in the outer circumferential side of the upper die 55 around the grooves 56 to set the temperature of the die relatively high. As the result of provision of the heater 57, the thermoplastic resin sheet is not hardened at once even when coming into contact with the grooves 56. Further, a heater 61 is embedded around the rim forming portion in the middle die 60 to set the temperature of the die relatively low. The heater 61 slightly delays the hardening of the thermoplastic resin sheet. Further, the bottom plate 65 has a cooling passage 66 through which a cooling liquid is circulated, so that the thermoplastic resin sheet is cooled so as to be rapidly hardened.

The operation of the thermoforming apparatus will be described with reference to FIGS. 5A to 5G. A heater and a feeder are provided in the previous stage of the thermoforming apparatus. Since they are well known in the art, the description of them will be eliminated. The rod 14a of the pneumatic cylinder 14 is contracted at the time of start of the forming. As a result, the chamber 16 and the plug 17 are positioned right over the frame 53.

In the aforesaid state, the upper and lower tables 1 and 2 are moved downward and upward respectively at time T1 with the thermoplastic resin sheet S such as polypropylene disposed therebetween. The thermoplastic resin sheet S is previously heated by a heater unit (not shown) so that a surface temperature thereof is about 180° C. As a result, the pneumatic forming chamber 16 and the pneumatic forming plug 17 are moved downward with the mounting plate 11 fixed to the upper table 1. The frame 53 and the female die 52 both fixed to the lower table 2 are moved upward.

Figure 6:
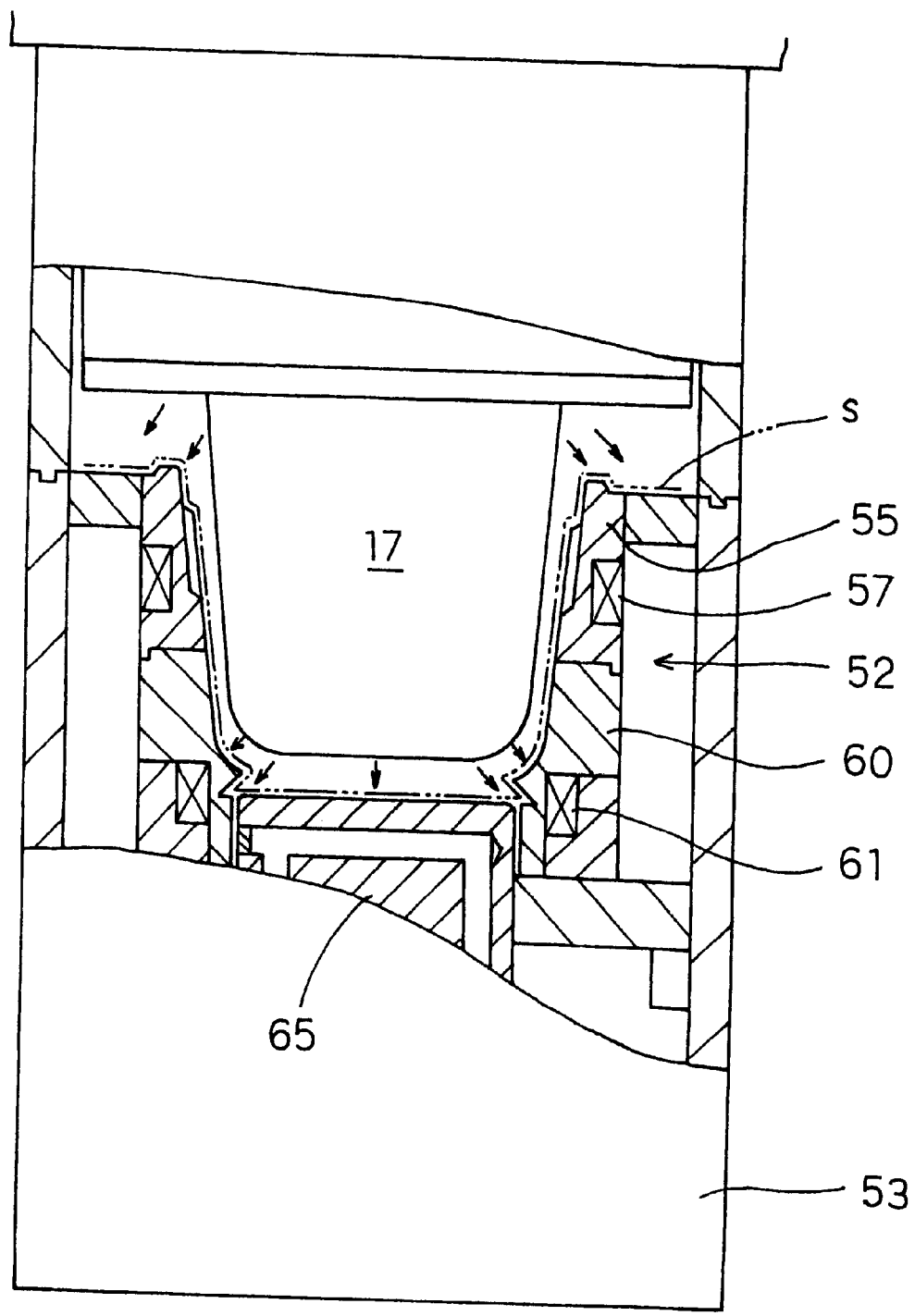
FIG. 6 is a partial sectional view of the thermoforming apparatus in the closed state.
Figure 7:
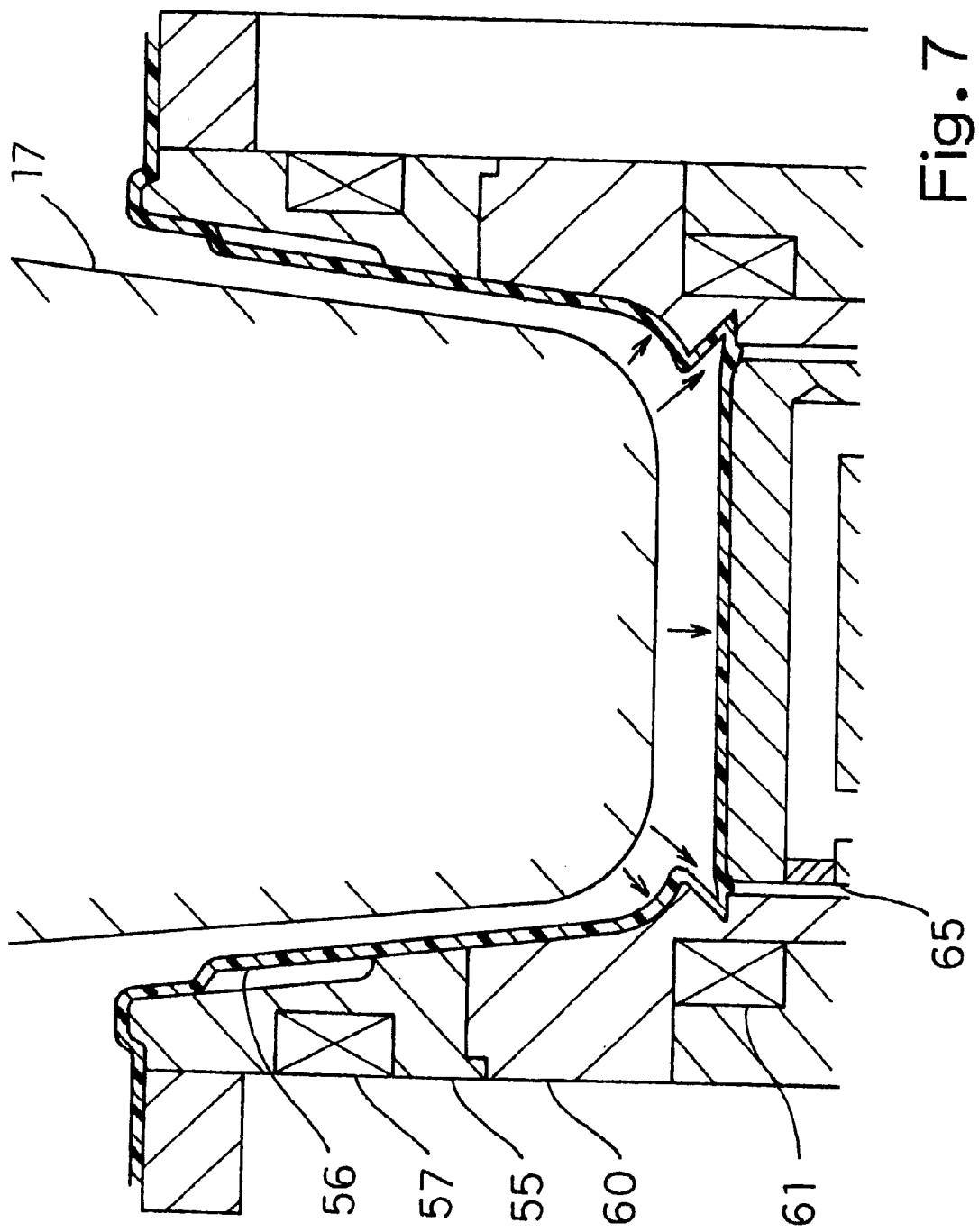
FIG. 7 is a schematic sectional view showing the state immediately after start of the forming by the thermoforming apparatus.
Figure 8:
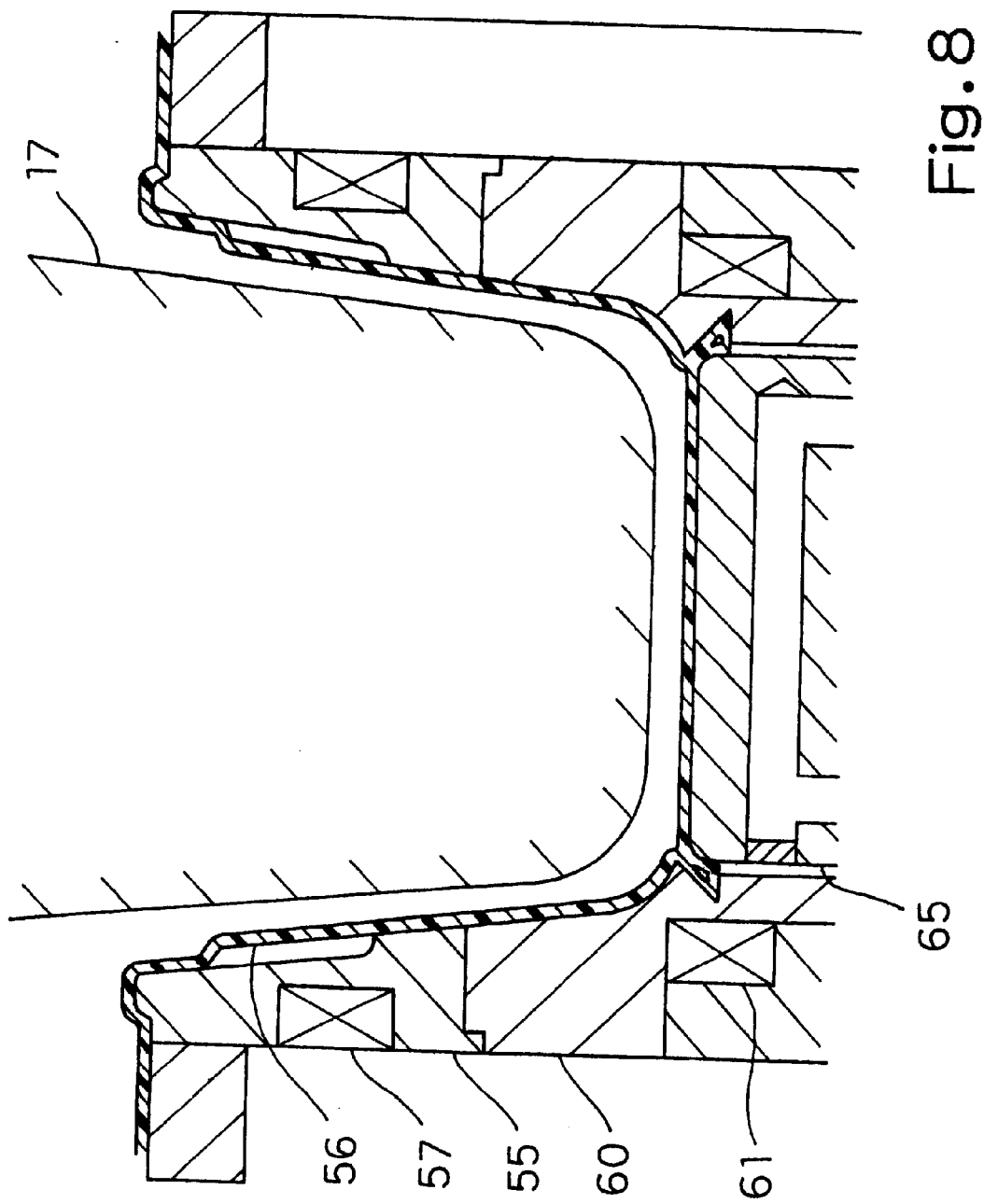
FIG. 8 is a schematic sectional view showing the state where the bottom plate of the thermoforming apparatus has been moved up.
Figure 9:
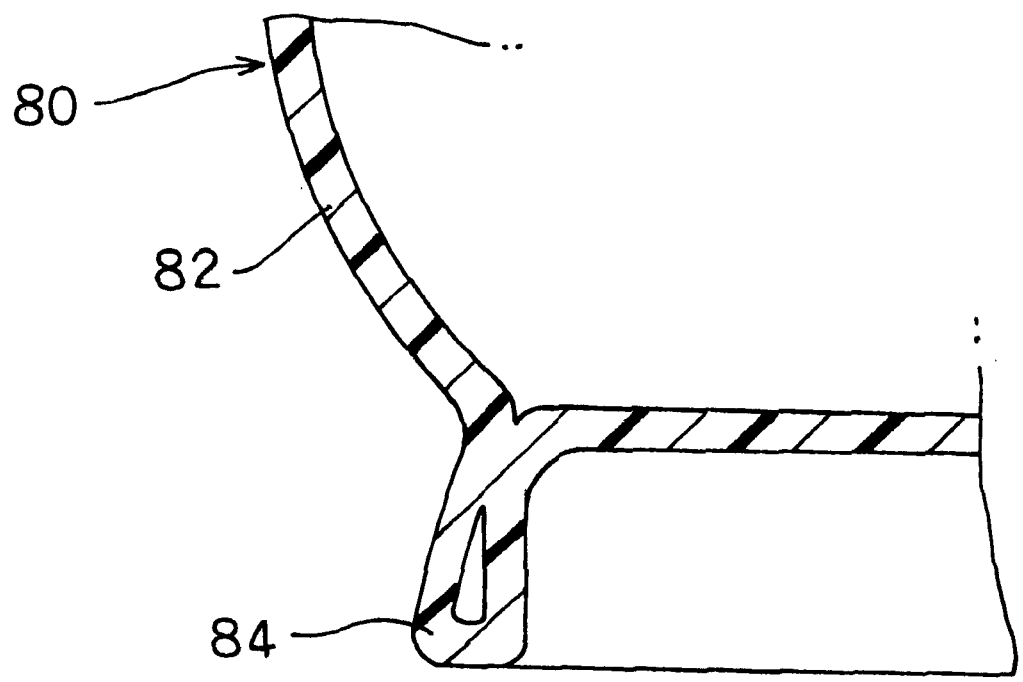
FIG. 9 is a sectional view of the rim in the state where the bottom plate has been moved up.

The plug 17 is pressed against the thermoplastic resin sheet so that the sheet is thrust into the female die 52 coming near to the plug. The thermoplastic resin sheet is held between the chamber 16 and the frame 53 and the die clamping is completed. Compressed air is then supplied into the chamber 16 at time T2. The pneumatic cylinder 67 is actuated at time T3 slightly after time T2 so that the bottom plate 65 is moved upward. FIGS. 6 to 8 show processes of deformation of the thermoplastic resin sheet in this while. As shown in FIGS. 6 and 7, when the chamber 16 is pressurized, the thermoplastic resin sheet expands toward the female die 52 to come close to the inner circumferential face of the female die. Since the temperature of the upper die 55 is relatively high in this state, the thermoplastic resin sheet in touch with the grooves 56 is not hardened immediately. On the other hand, although the temperature of the middle die 60 is lower than that of the upper die 55, the part of the thermoplastic resin sheet positioned in the rim forming recess maintains semi-melted state. The part of the thermoplastic resin sheet positioned on the top of the bottom plate 65 is hardened relatively early. When the bottom plate 65 is moved upward, this part of the sheet is raised as shown in FIG. 8 such that a portion of the sheet in contact with the rounded circumferential edge is pressed against a portion of the sheet in contact with the inclined face. Since the time is relatively short, these portions of the sheet opposed to each other are semi-melted and welded together such that gaps are eliminated. FIG. 9 shows the section of the rim 84 welded as described above. The position of the bottom plate 65 as shown in FIG. 8 is referred to as "second stop position," whereas the initial standby position is referred to as "first stop position."

The compressed air in the chamber 16 is discharged into the atmosphere at time T4 with the bottom plate 65 remaining at the second stop position. Only the upper table 1 is moved upward at time T5. At this time, the primary forming is completed and the primary molding is held in the female die 52. When the rod 14a of the pneumatic cylinder 14 is then extended, the cooling male die 20 is moved to the position of the plug 17. The upper table 1 is moved downward again at time T7.

Figure 10:
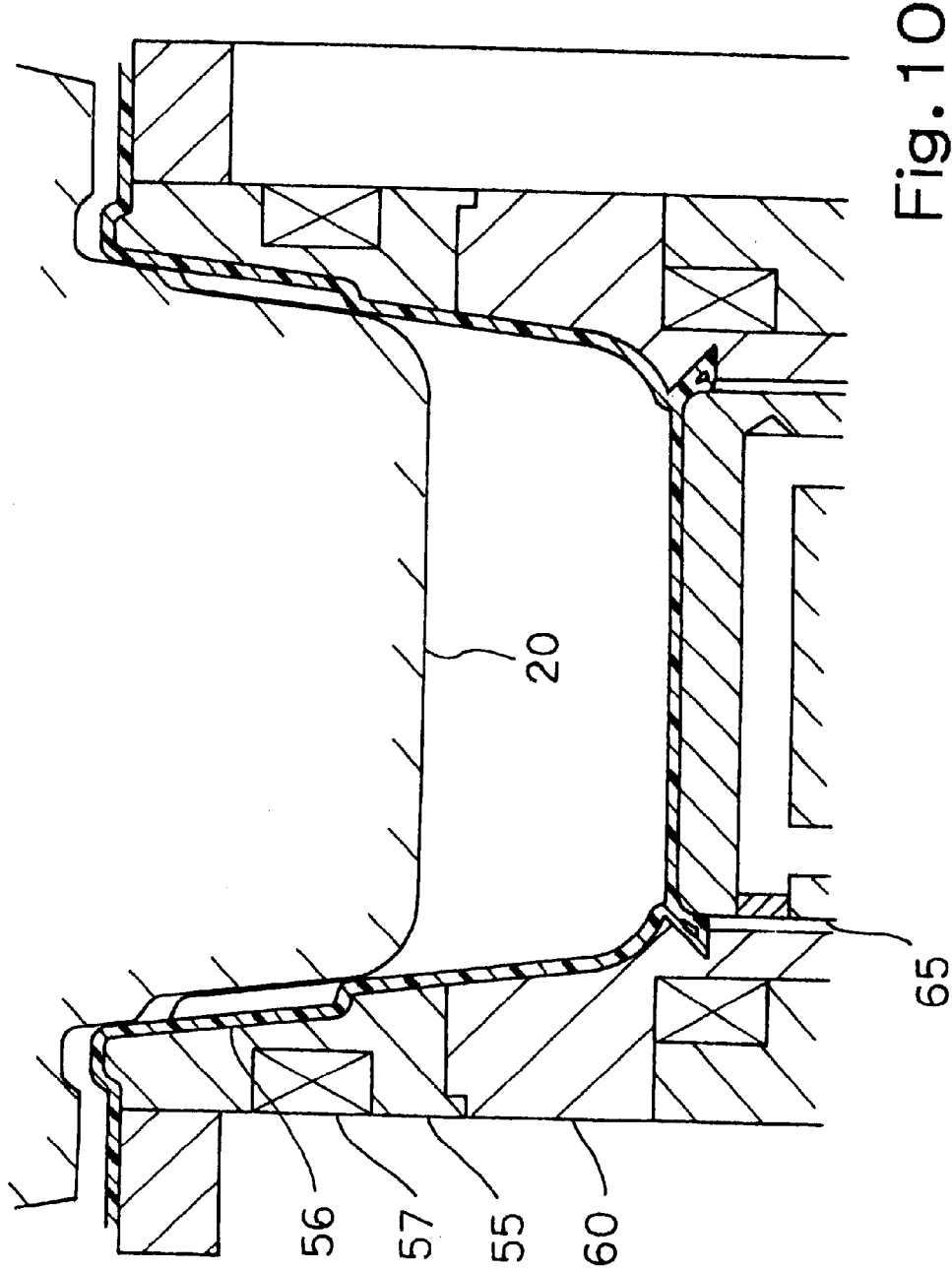
FIG. 10 is a partial sectional view of the thermoforming apparatus immediately after start of secondary forming.
Figure 11:
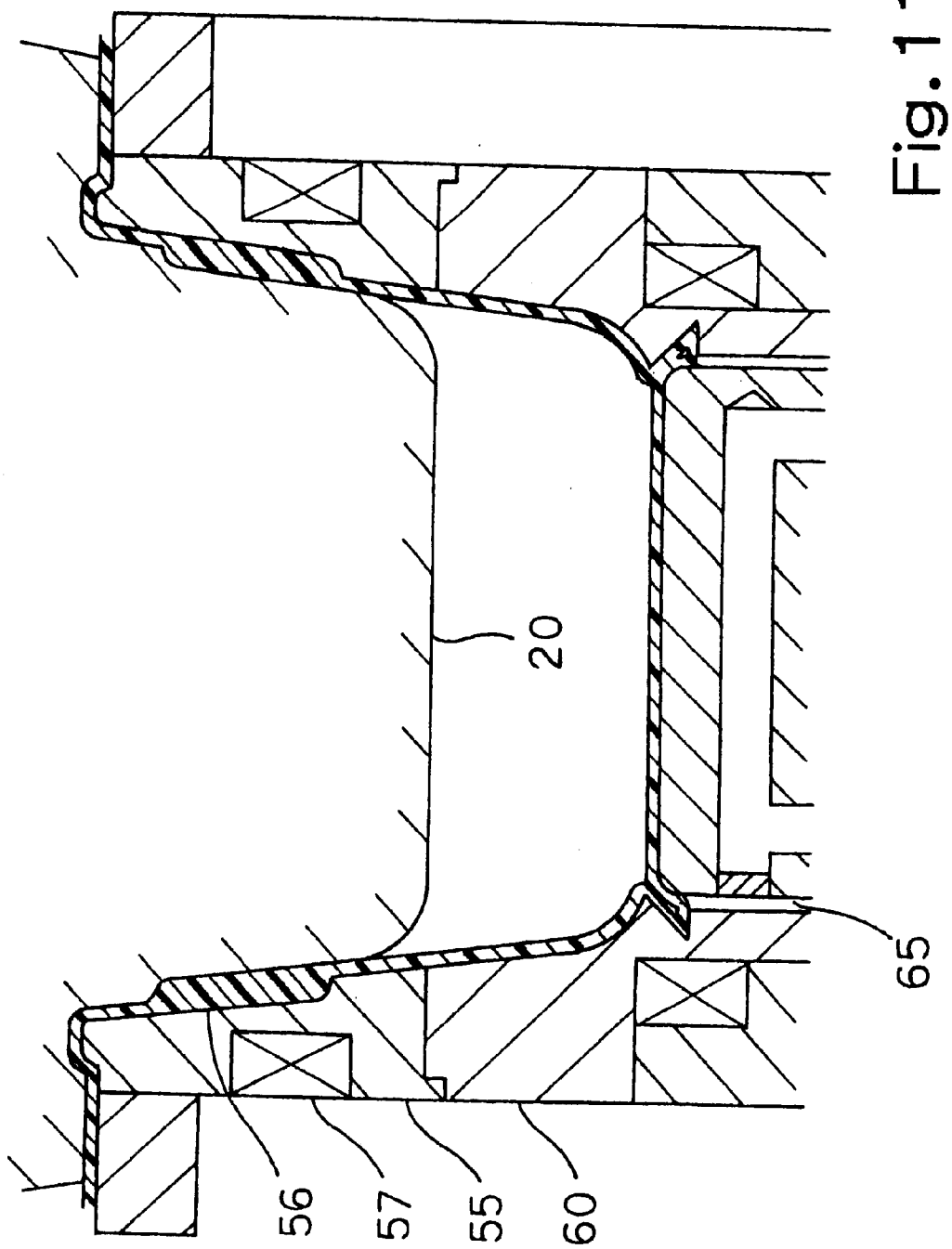
FIG. 11 is a partial sectional view of the thermoforming apparatus upon completion of the secondary forming.
Figure 12:
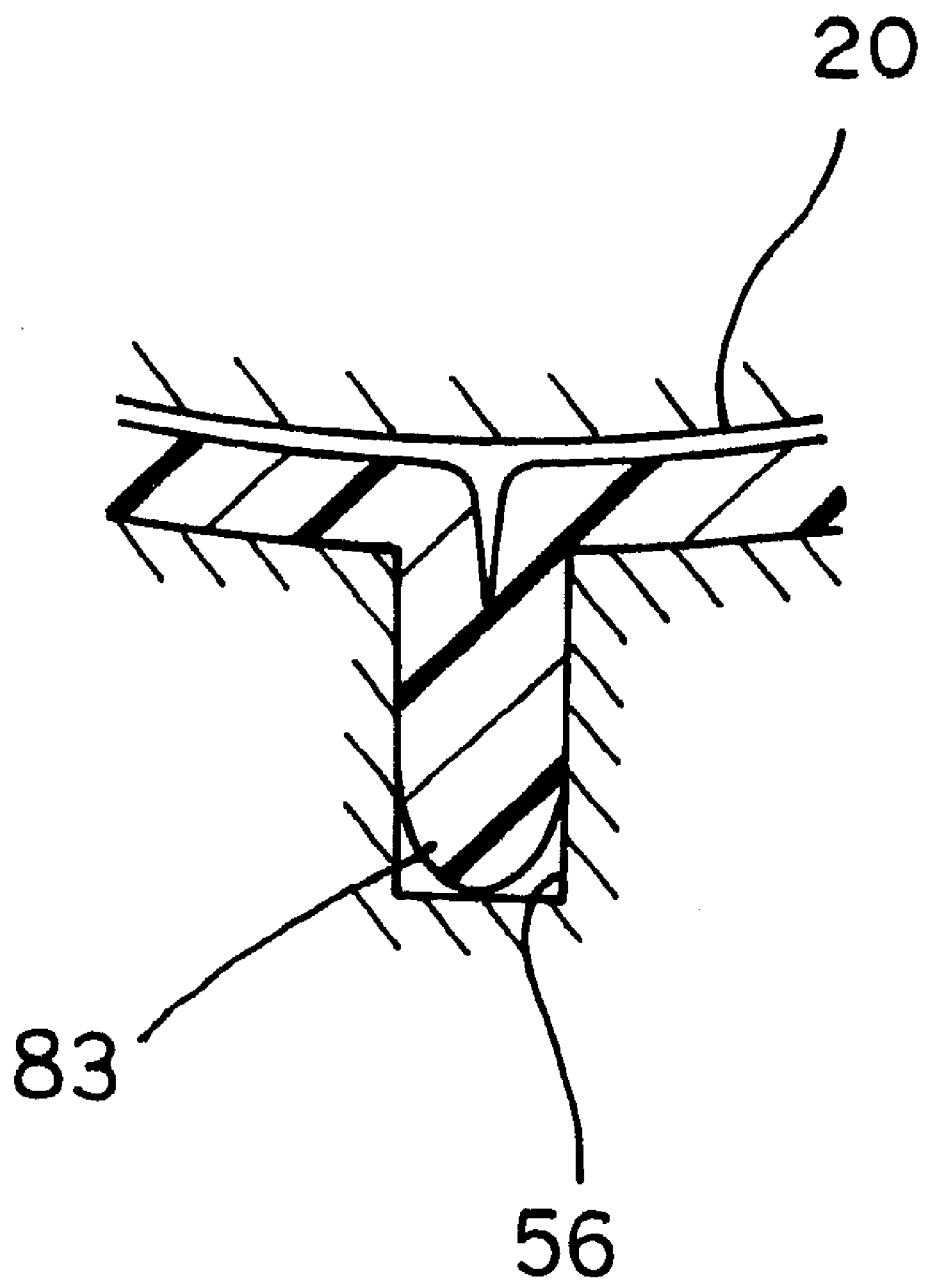
FIG. 12 is a sectional view of a rib immediately after start of secondary forming.
Figure 13:
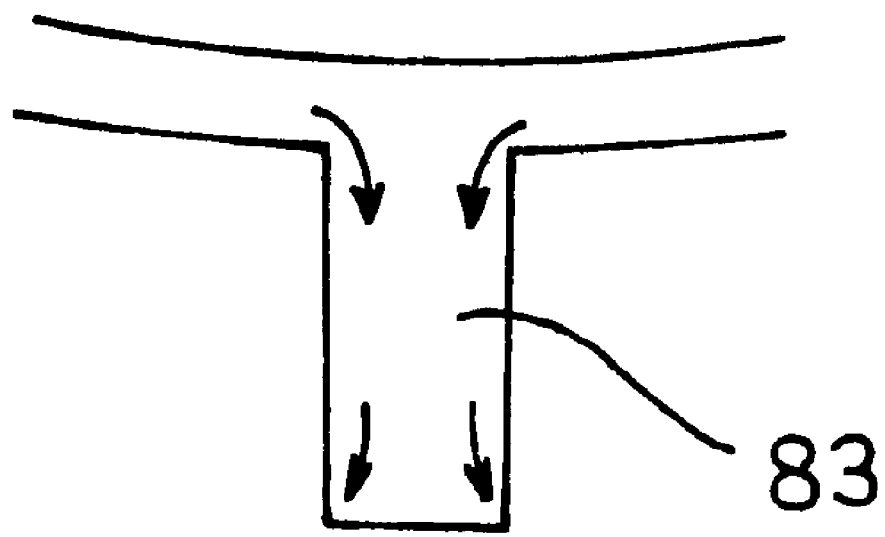
FIG. 13 typically shows a process in which the thermoplastic resin sheet flows in the secondary forming.
Figure 14:
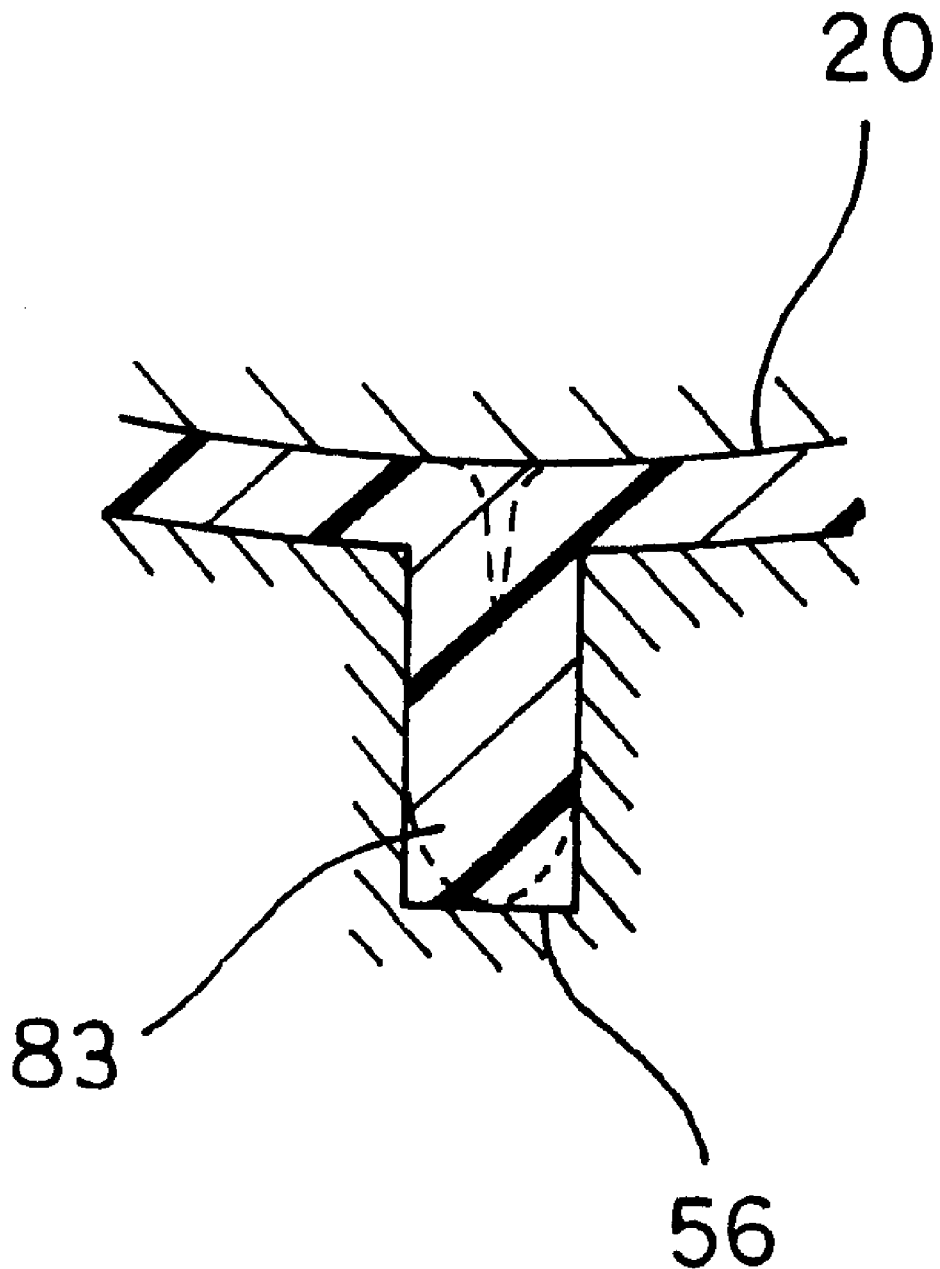
FIG. 14 is a sectional view of the rib upon completion of the secondary forming.

Upon descent of the upper table 1, the cooling male die 20 enters the female die 52. FIGS. 10 and 11 show final stages of the entrance of the male die 20 into the female die 52. The thermoplastic resin sheet S does not completely enter the grooves 56 when the compressed air is just supplied into the chamber 16. Even while the sheet S is being heated by the heater 57, it enters the grooves 56 to such an extent as shown in FIG. 12. However, when completely assuming the position in the female die 52, the cooling male die 20 presses the thermoplastic resin sheet against the female die 52 such that the unhardened sheet is thrust into the grooves 56 as shown in FIG. 13. Finally, no gaps are formed in the inner face of the container 80 as shown in FIG. 14. More specifically, the cooling male die 20 presses the primary molding against the inner circumferential face of the female die 52 so that the aforesaid ribs 83 and the upper body of the container 80 are formed. As a result, a secondary molding or finished product is formed.

Lastly, vacuum is applied to the hole 22 of the cooling male die 20 at time T8 so that the bottom plate 65 assuming the second stop position is moved downward to the first stop position at time T9. When the lower table 2 is moved downward with the hole 22 subjected to vacuum at time T10, the bowl-shaped container 80 adherent to the cooling male die 20 is exposed. Supply of vacuum is stopped at time T11 and compressed air is supplied at time T12. Then, the bowl-shaped container 80 made of the thermoplastic resin sheet S is removed from the cooling male die 20, and the upper table 1 is moved upward at time T13. Supply of compressed air is stopped at time T14.

The upper and lower tables 1 and 2 are departed away from each other with the remainder of the sheet S being left therebetween, and the rod 14a of the pneumatic cylinder 14 is contracted for the subsequent forming.

According to the foregoing embodiment, the thermoplastic resin sheet is expanded in the rim forming recess continuous with bottom opening of the female die 52. However, the bottom plate 65 is immediately moved upward toward the bottom opening so that the thermoplastic resin sheets are caused to come close to each other and welded together. Consequently, the rim of the container 80 has no openings. Further, when the thermoplastic resin sheet is expanded in the female die 52 to come into contact with the inner circumferential face of the die, the sheet enters the grooves 56. Further, when the cooling male die 20 is pushed into the main die instead of the plug 17, a part of the sheet outside the grooves 56 is pressurized to enter the grooves. Consequently, the openings formed in the inner circumferential face of the container 80 are closed while the ribs 83 is formed. Since the bowl-shaped container 80 has no openings in the rim and the inner circumferential face of each rib 83, it can easily be re-used when cleaned.

FIGS. 15 to 20 illustrate a second embodiment of the invention. In the second embodiment, a pneumatic forming plug 71 is provided instead of the integral plug 17. The plug 71 includes a head 71a and a body 71b discrete from each other. The rim forming recess of the female die 72 is not spread outward but cylindrical. The female die 72 includes another cylindrical portion which has a slightly reduced diameter and is continuous with the rim forming recess. A bottom plate 73 is in close contact with the cylindrical portion with a smaller diameter and supported to be vertically moved. The bottom plate 73 is moved by the pneumatic cylinder 14. The cooling male die 20 and the switching cylinder 14 are eliminated in the second embodiment.

The head 71a and the body 71b of the plug 71 are discrete from each other for the following reason. The rim forming recess has a depth approximately equal to the length of the rim. An outer wall of the rim is formed by a first portion of the sheet corresponding to the rim, and an inner wall of the rim is formed by the subsequent portion of the sheet corresponding to the rim. The sheet is folded when the bottom plate 73 is moved upward, so that the inner wall is formed. Since the rim forming recess is deep, compressed air needs to be supplied so that the sheet is extended deep into the rim when the plug 71 enters the bowl-shaped recess of the female die 72. As a result, a thickness providing a predetermined strength cannot be obtained. On the other hand, when the distal end of the plug 71 is caused to enter the inside of the rim forming recess, the problem of thickness can be solved. However, the bottom plate 73 interferes with the plug 71 when moved upward.

Figure 15:
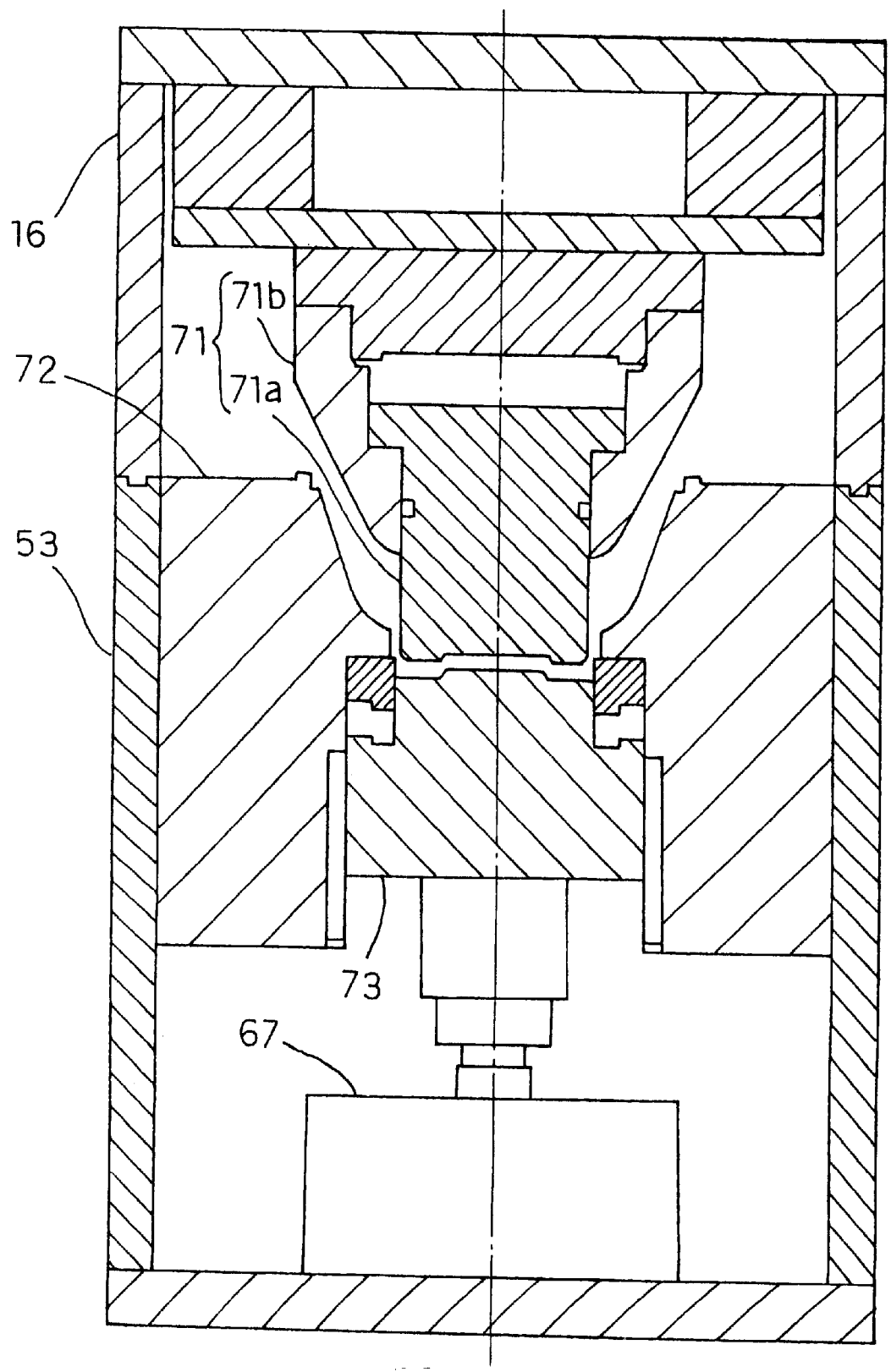
FIG. 15 is a sectional view of the thermoforming apparatus of a second embodiment in accordance with the invention, showing the state where the bottom plate assumes a lowest position.
Figure 16:
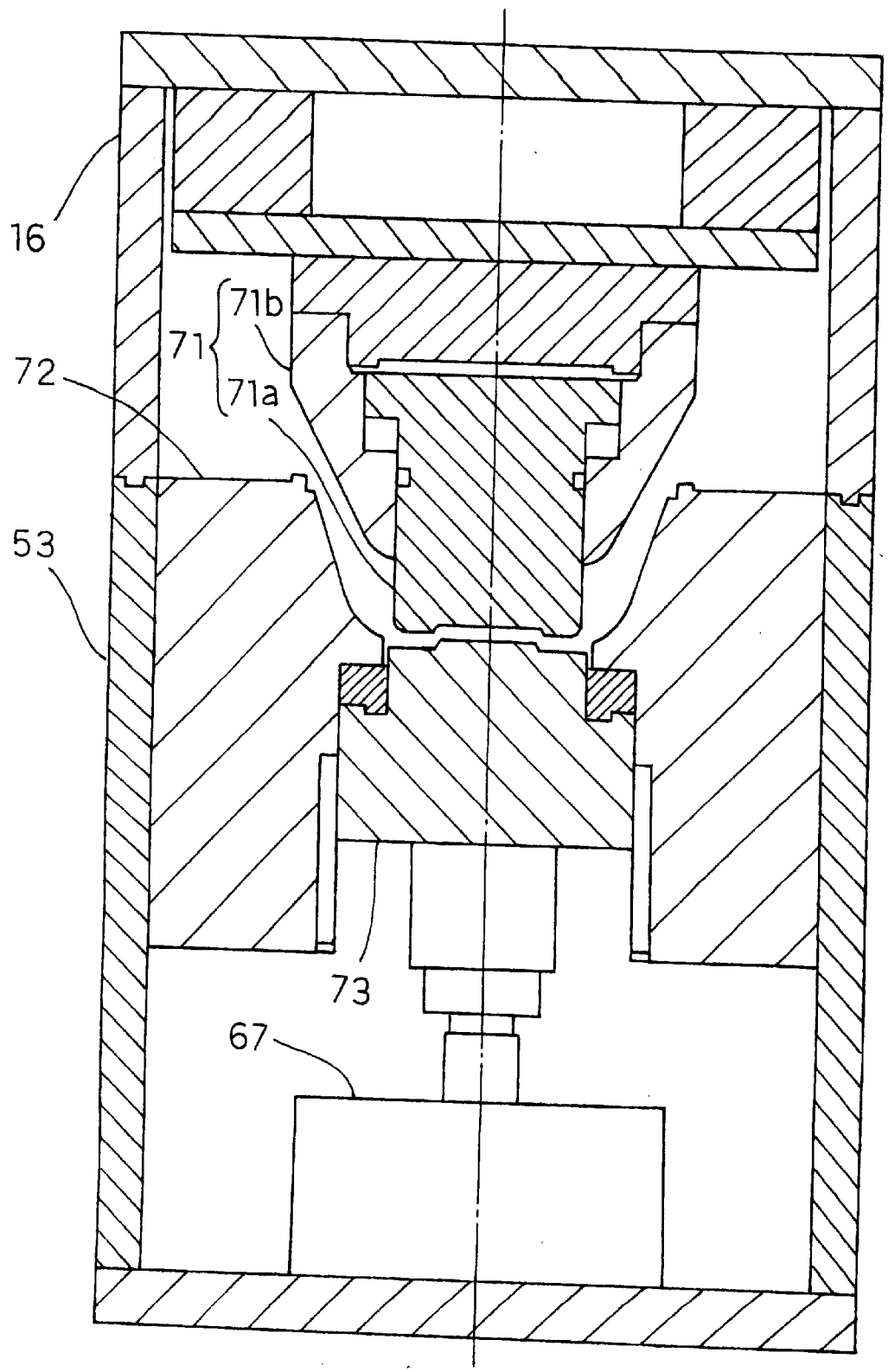
FIG. 16 is a sectional view of the thermoforming apparatus in the state where the bottom plate has been moved up.

In view of the above-described drawback, the head 71a and the body 71b are discrete from each other. As a result, when the bottom plate 73 is moved downward to the first stop position, the head 71a of the plug 71 enters the rim forming recess as shown in FIG. 15. However, the head 71a and the body 71b are discrete from each other so that the head 71a is retreated from the rim forming recess into the female die 72 when the bottom plate 73 is moved upward to the second stop position. The interior of the body 71b is compressed and decompressed so that the head 71a projects and is retreated.

Figure 17:
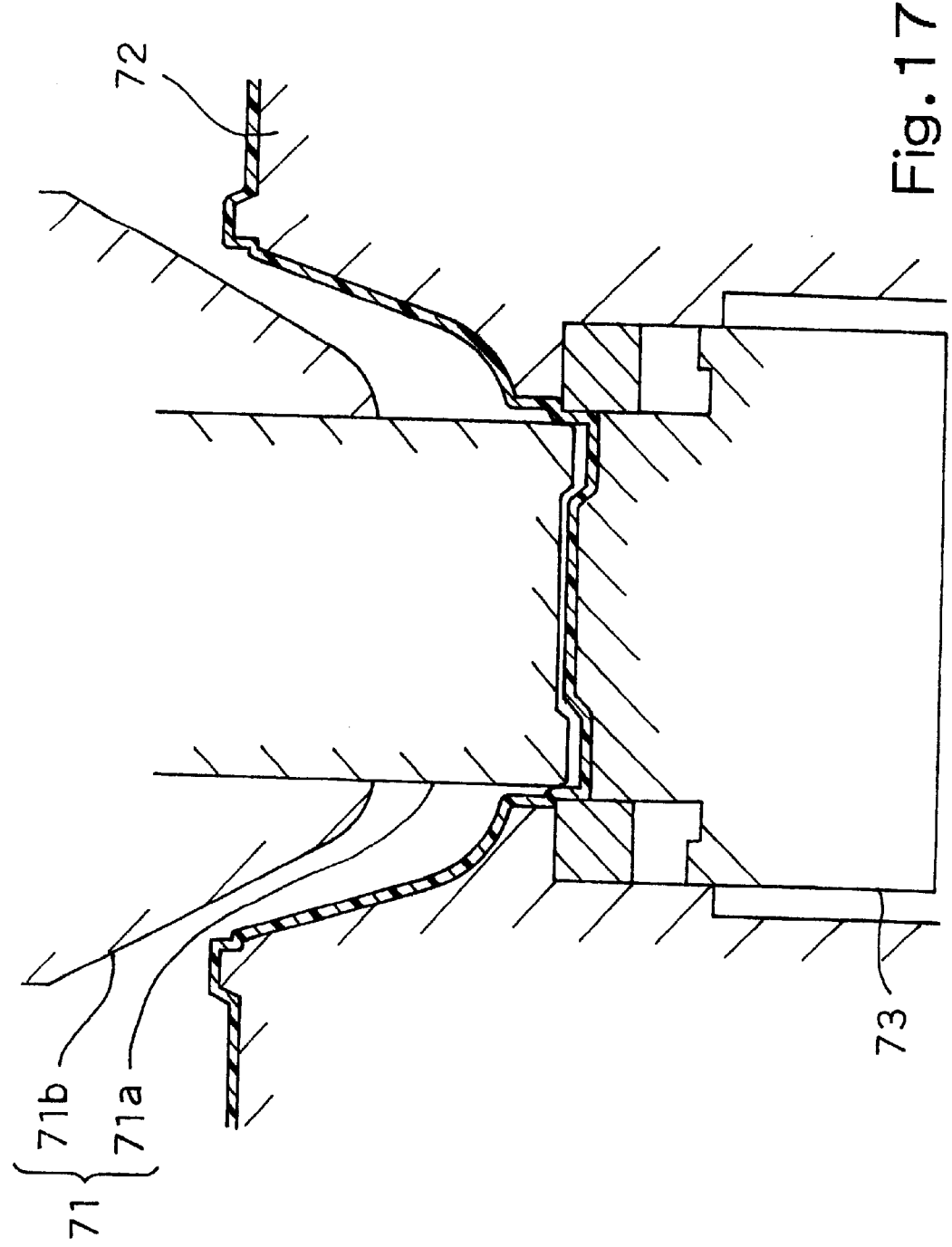
FIG. 17 is a sectional view of the thermoforming apparatus immediately after start of forming.
Figure 18:
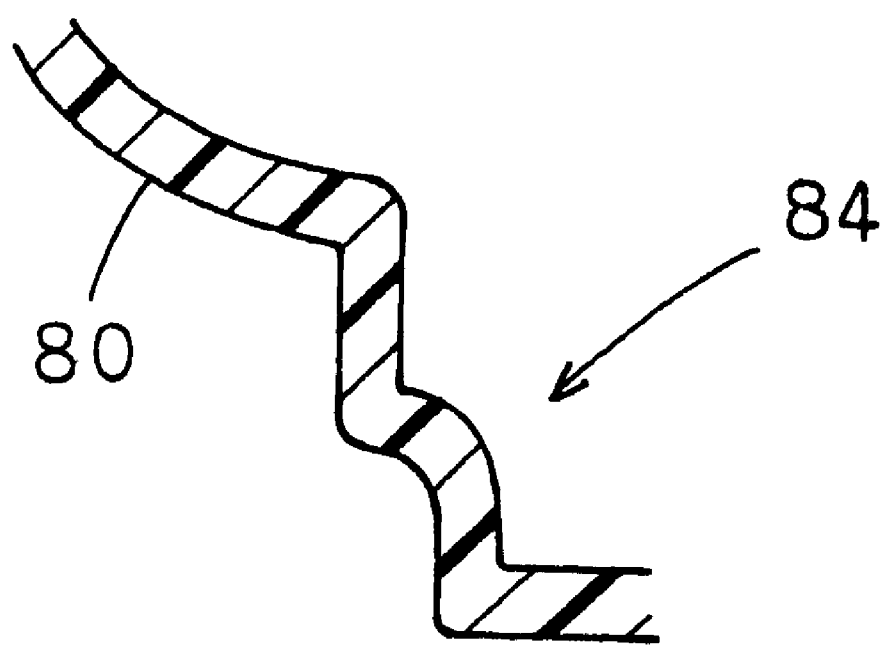
FIG. 18 is a sectional view of the rim immediately after start of forming.

At the initial stage of the forming, the head 71a is caused to project and the upper and lower tables 1 and 2 are moved downward and upward respectively with the thermoplastic resin sheet disposed therebetween. The distal end of the head 71a of the plug 71 extends the thermoplastic resin sheet to the inside of the rim forming recess. When compressed air is supplied into the chamber 16 upon completion of die clamping by the chamber and the frame 53, the thermoplastic resin sheet comes into close contact with the inner circumferential face of the female die 72 as shown in FIG. 17. The female die 72 is provided with no heater. Accordingly, the part of the sheet in close contact with the inner circumferential face of the female die 52 starts to harden earlier than in the foregoing embodiment.

On the other hand, vacuum is applied to the inside of the plug 71 immediately after supply of compressed air into the chamber 16 so that the head 71a is retreated, and compressed air is supplied into the pneumatic cylinder 67 so that the bottom plate 73 is moved upward. When the thermoplastic resin sheet is expanded, the rim portion extends downward in two stages. Thus, the rim portion does not assume an ordinary configuration of the rim. However, outer circumferential faces of the two stage portions is in close contact with the female die 72 such that the hardening has already been initiated.

Figure 19:
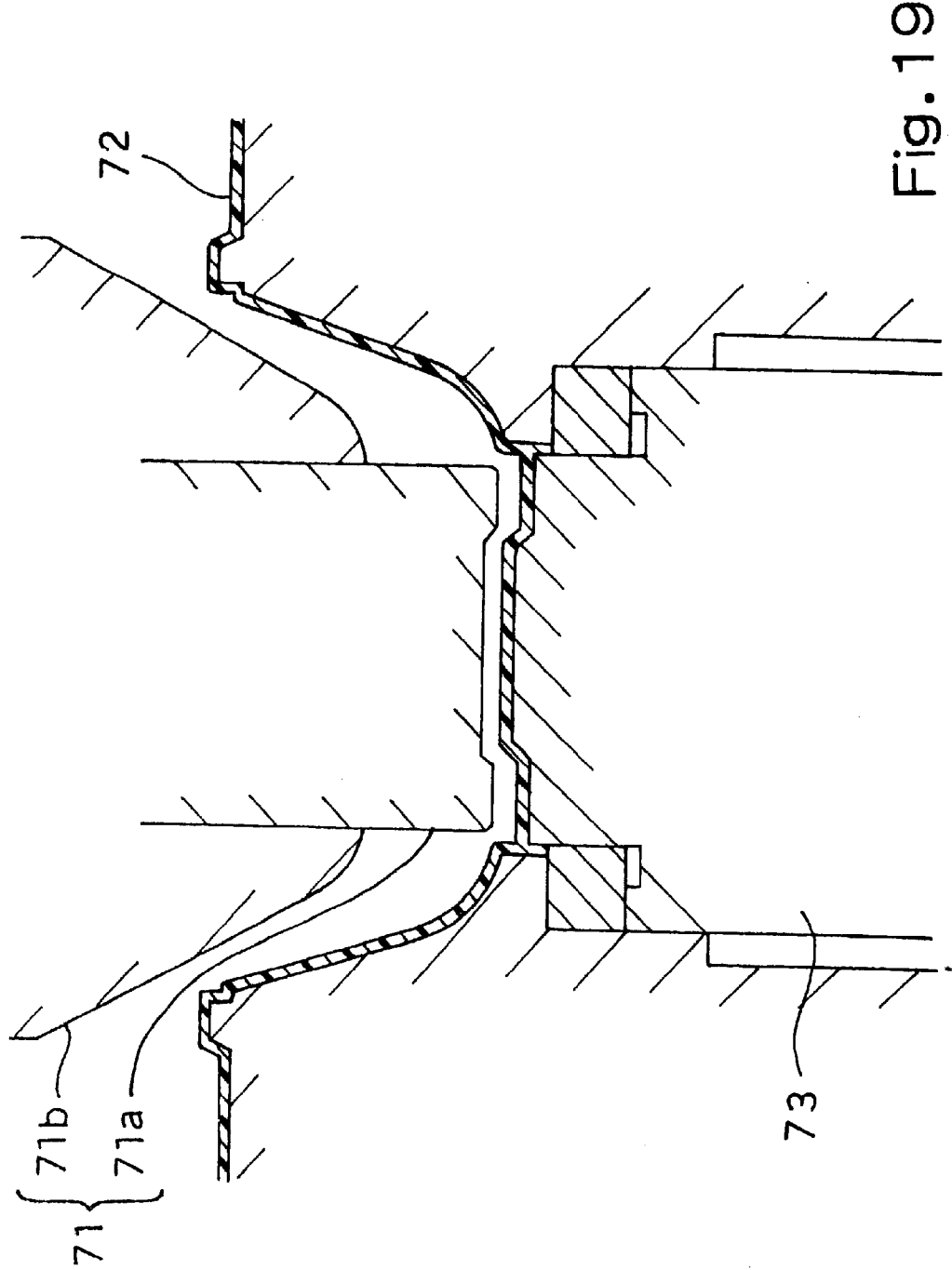
FIG. 19 is a sectional view of the thermoforming apparatus in the state where the bottom plate has been moved up.
Figure 20:
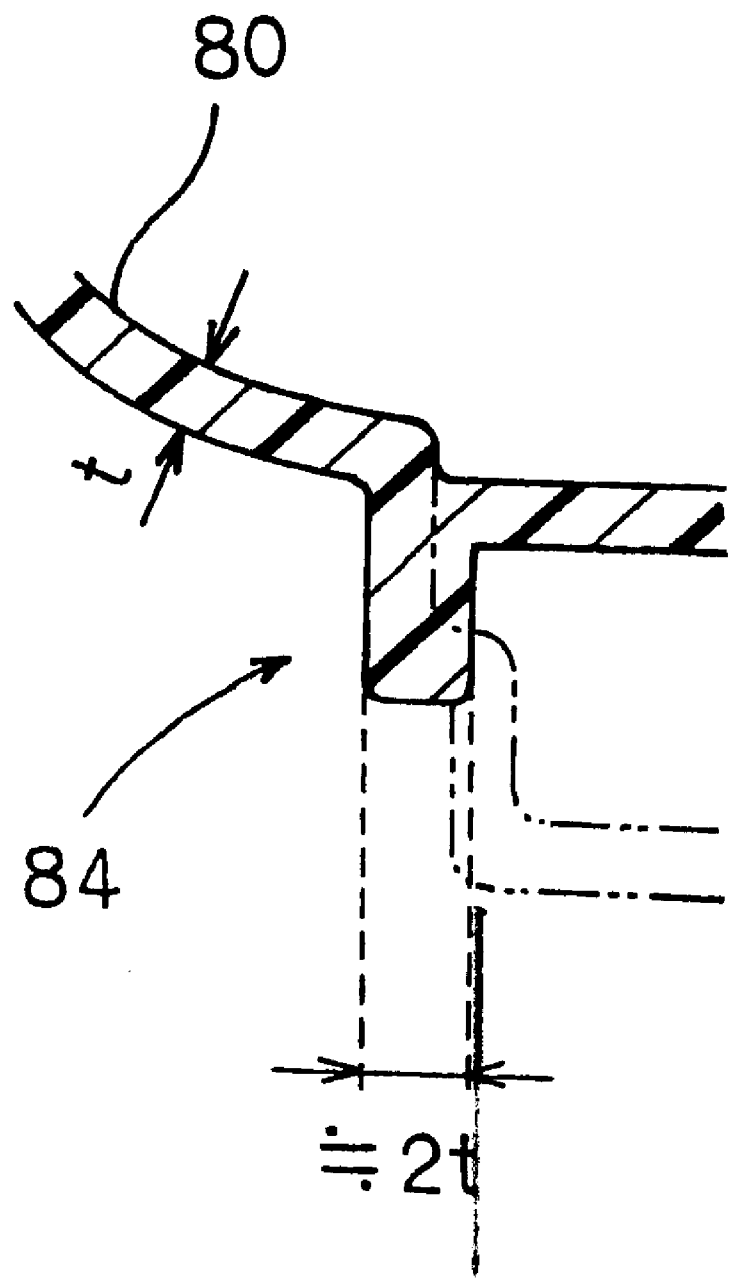
FIG. 20 is a sectional view of the rim in the state where the bottom plate has been moved up.
Figure 21:
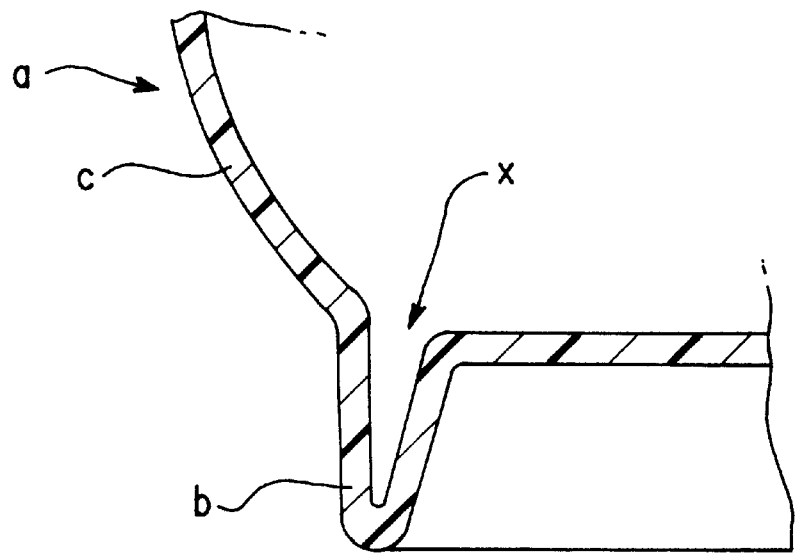
FIG. 21 is a schematic sectional view of a rim of a conventional bowl-shaped container.
Figure 22:
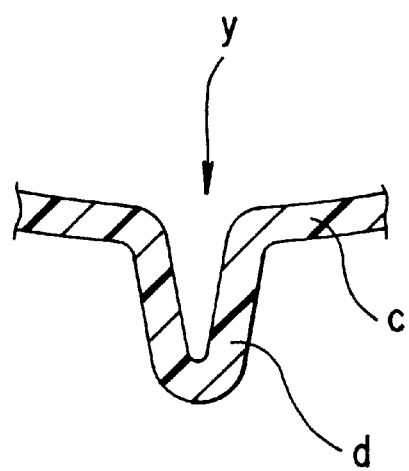
FIG. 22 is a schematic sectional view of a rib of the conventional bowl-shaped container.

However, when the bottom plate 73 is moved upward immediately as shown in FIG. 19, the portion in contact with the inner face of the reduced-diameter portion of the rim forming recess is folded back. The sides which have not been in contact with the female die 72 are caused to come close to each other. Since these sides are semi-melted, they are welded together when coming close to each other. Since the portion in contact with the female die 72 has already been hardened, this portion forms the outer and inner circumferential walls of the rim without getting out of shape. FIG. 20 shows the folded sheet.

The sheet needs to be pressed so that the inner circumferential sides are welded together. For this purpose, the thickness of the reduced-diameter portion of the rim forming recess needs to be slightly smaller than a double (2t) of the thickness t of the thermoplastic resin sheet. More specifically, in a case where the thickness of the reduced-diameter portion is equal to or larger than the double of the thickness t, the inner sides do not come close to each other even when the sheet is folded back. In this case, the sheet is hardened with gaps. On the other hand, the thickness of the reduced-diameter portion is much smaller than the double of the thickness t, the sheet cannot be folded back desirably, whereupon the whole rim would be moved into the female die 72 when the bottom plate 73 is moved upward. In view of the foregoing, the two-stage configuration of the rim forming recess needs to be adjusted.

In the above-described bowl-shaped container, the rim is formed by superposing two thermoplastic resin sheets. Consequently, the strength of the container can be improved and its utility can be improved. Further, since a sufficient thickness increases the profoundness and grade of the container, the container has a good quality.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A bowl-shaped container having a closed hollow rim of a bottom, comprising a themoplastic sheet formed to a bowl shape, a sidewall portion of said thermoplastic sheet folded against a bottom wall portion of said thermoplastic sheet to form said closed hollow rim, with portions of the surface of said thermoplastic sheet opposing each other within said hollow rim, said folded sheet being welded together at a top of said hollow rim so as to have:

no gap across the top of the rim, and no opposing surface portions across the top of the rim.

2. The container according to claim 1, wherein the hollow rim has outer circumferential surface formed into such an inclined face that the outer circumferential surface expands outward as it goes downward.

3. A bowl-shaped container according to claim 1, made by thermoforming a thermoplastic resin sheet, the container including a body having a plurality of ribs protruding outward and no slit-like recess in an inner circumferential face thereof.

4. The container according to claim 3, wherein the ribs are formed by thrusting the thermoplastic resin sheet into a plurality of grooves formed in a forming female die.

* * * * *